United States Patent
Arai et al.

(10) Patent No.: US 9,957,387 B2
(45) Date of Patent: May 1, 2018

(54) EPOXY RESIN COMPOSITION FOR FIBER REINFORCED COMPOSITE MATERIAL, PREPREG, AND FIBER REINFORCED COMPOSITE MATERIAL

(75) Inventors: Nobuyuki Arai, Bellevue, WA (US); Alfred P. Haro, Spanaway, WA (US); Jonathan C. Hughes, Auburn, WA (US); Norimitsu Natsume, Puyallup, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 675 days.

(21) Appl. No.: 13/881,790

(22) PCT Filed: Nov. 7, 2011

(86) PCT No.: PCT/US2011/059610
§ 371 (c)(1),
(2), (4) Date: Apr. 26, 2013

(87) PCT Pub. No.: WO2012/064662
PCT Pub. Date: May 18, 2012

(65) Prior Publication Data
US 2013/0217283 A1    Aug. 22, 2013

Related U.S. Application Data

(60) Provisional application No. 61/411,231, filed on Nov. 8, 2010, provisional application No. 61/530,173, filed on Sep. 1, 2011.

(51) Int. Cl.

| | |
|---|---|
| *C08L 63/04* | (2006.01) |
| *C08G 59/28* | (2006.01) |
| *C08G 59/40* | (2006.01) |
| *C08G 59/50* | (2006.01) |
| *C08L 63/00* | (2006.01) |
| *C08J 5/24* | (2006.01) |
| *B32B 37/00* | (2006.01) |
| *C08G 59/32* | (2006.01) |

(52) U.S. Cl.
CPC ............ *C08L 63/04* (2013.01); *B32B 37/003* (2013.01); *C08G 59/28* (2013.01); *C08G 59/3227* (2013.01); *C08G 59/4021* (2013.01); *C08G 59/504* (2013.01); *C08J 5/24* (2013.01); *C08L 63/00* (2013.01); *C08J 2363/00* (2013.01); *Y10T 442/20* (2015.04)

(58) Field of Classification Search
CPC ............. C08G 59/28; C08G 59/3227; C08G 59/4021; C08L 63/00; Y10T 442/20
USPC ............................................... 442/59; 528/90
See application file for complete search history.

(56) References Cited

U.S. PATENT DOCUMENTS

| | | | |
|---|---|---|---|
| 5,230,906 A | 7/1993 | Mueller | |
| 5,317,068 A * | 5/1994 | Watanabe | C08G 59/3218 525/524 |
| 6,391,436 B1 | 5/2002 | Xu | |
| 2002/0009581 A1 | 1/2002 | Kishi et al. | |
| 2003/0124355 A1 * | 7/2003 | Li | C08G 59/4021 428/417 |
| 2004/0214007 A1 | 10/2004 | Brown et al. | |
| 2005/0173823 A1 | 8/2005 | Hinc et al. | |
| 2006/0035088 A1 | 2/2006 | Takano | |
| 2011/0143110 A1 * | 6/2011 | Tsuchiya | B29C 70/08 428/213 |

FOREIGN PATENT DOCUMENTS

| | | |
|---|---|---|
| JP | 2000-017090 | 1/2000 |
| JP | 2004-050574 | 2/2004 |
| JP | 2006-28274 | 2/2006 |
| JP | 2008-088276 | 4/2008 |
| JP | 2009-292976 | 12/2009 |
| WO | WO00/53654 | 9/2000 |
| WO | WO 2010013645 | * 2/2010 |

OTHER PUBLICATIONS

International Search Report dated Mar. 12, 2012 for PCT/US2011/059610 filed Nov. 7, 2011 (11 pages).
English translation of Japanese Office Action dated Sep. 3, 2015 in corresponding Japanese Patent Application No. 2013-537913.

* cited by examiner

*Primary Examiner* — Vincent A Tatesure
(74) *Attorney, Agent, or Firm* — Pillsbury Winthrop Shaw Pittman LLP

(57) ABSTRACT

An epoxy resin composition having components (A), (B), (C), and (D), wherein the epoxy resin composition has a viscosity at 40° C. of about $1\times10^3$ to about $1\times10^4$ Pa·s, a curing start temperature of about 90 to about 110° C., and a minimum viscosity at the curing start temperature of about 2 to about 20 Pa·s, wherein the components (A), (B), (C), and (D) are as follows: (A) About 60 weight parts or more of a tetraglycidyl amine type epoxy resin per 100 weight parts of the epoxy resin blend; (B) Dicyandiamide; (C) Diaminodiphenyl sulfone and (D) Urea compound.

19 Claims, No Drawings

EPOXY RESIN COMPOSITION FOR FIBER REINFORCED COMPOSITE MATERIAL, PREPREG, AND FIBER REINFORCED COMPOSITE MATERIAL

CROSS REFERENCE TO RELATED APPLICATIONS

This application is a U.S. National Phase of PCT/US2011/059610, filed Nov. 7, 2011, which claims benefit to U.S. Provisional Application No. 61/411,231, filed Nov. 8, 2010, and U.S. Provisional Application No. 61/530,173, filed Sep. 1, 2011, the contents of which are incorporated herein by reference in their entirety.

FIELD OF THE INVENTION

The present invention relates to an epoxy resin composition for fiber reinforced composite materials, that can be molded in a low cost process in a short period of time, using only a vacuum pump and an oven, that does not experience a drop in heat resistance, environmental resistance, and has excellent mechanical properties suitable for use in structural materials of aircraft, and that can be used to provide fiber reinforced composite materials with excellent panel quality comparable to that of an autoclave. The present invention also relates to a prepreg and a fiber reinforced composite material that uses this epoxy resin.

BACKGROUND OF THE INVENTION

Carbon fiber reinforced composite materials have excellent mechanical properties such as strength, toughness, durability and stiffness while being lightweight, and therefore have been widely deployed in aircraft structures, spacecraft structures, automobile structures, railway car structures, marine vessel structures, sporting goods, and computer such as housings for laptop computers. Therefore demand has been increasing each year in these fields. Aircraft structures and spacecraft structures in particular require excellent mechanical properties and heat resistance, and therefore carbon fibers are most commonly used as reinforcing fibers. Herein, spacecraft structures refer to structures that are used for example in man-made satellites, rockets, and space shuttles and the like.

Furthermore, the most common use of thermosetting resins as matrix resins are combinations of epoxy resins and polyamines that have excellent heat resistance, modulus of elasticity, and chemical resistance with minimal cure shrinkage. The manufacturing method of these carbon fiber reinforced composite materials primarily involves heating and pressure molding using an autoclave or the like, but there are problems with the high cost of molding, the large size of molding equipment, and restrictions in the molding size due to the equipment, and the like (for example, refer to patent document 1).

In light of the aforementioned problems, a low cost molding method has been proposed that can perform molding using only a vacuum pump and an oven, without using expensive molding equipment such as an autoclave. Conventionally, when molding a composite material by laminating a prepreg and curing, water vapor from the epoxy resin composition and air that are trapped in prepreg layers or between layers forms voids, and therefore high-pressure is often applied using an autoclave or the like during molding in order to prevent these voids from growing. However, recently, it has being reported that a low void panel could be achieved in a process that removes the water vapor of molding and trapped air to the outside of the molded panel, by using a partially impregnated prepreg where the matrix resin is partially impregnated into reinforcing fibers, and utilizing the unimpregnated section of the reinforcing fibers as an air path. However, when removing water vapor and trapped air by a vacuum pump, generally water vapor and trapped air must be removed outside of the molded panel by maintaining the prepreg at a relatively low temperature for a long period of time under vacuum to retain the air paths and the fluidity of the matrix resin, and therefore to effectively remove water vapor and trapped air, there is a problem that the molding time is much longer than with autoclave molding (for example, refer to patent document 2).

On the other hand, when using fiber reinforced composite materials in aircraft structural materials, enhancing the mechanical properties, particularly the compressive strength, is important, while at the same time enhancing properties such as heat resistance and environmental resistance is also important. A prepreg that uses a matrix resin containing tetraglycidyl amine type epoxy resin and diaminodiphenyl sulfone as a hardener provides high adhesion to reinforcing fibers and matrix resins, and the fiber reinforced composite material obtained has high mechanical properties. In addition, to achieve high quality of the cured parts for aircraft structures, conventionally an autoclave is used for these prepregs. However, the energy required for heating and pressuring is high when these prepregs are cured and formed into molded parts, at temperatures of approximately 180° C. and pressures of approximately 0.7 MPa. A large amount of energy is required for heating and pressurizing in autoclave processing. So there is strong demand for a prepreg that can be molded in a low cost process by energy savings and provide a fiber reinforced composite material that has high mechanical properties suitable for use in structural materials for aircraft, while simultaneously having high heat resistance and environmental resistance.

In the past, forming such prepreg systems which can be cured at low cost in a short period of time by low temperature cure using only a vacuum pump and an oven to achieve excellent mechanical properties, heat resistance, and environmental resistance suitable for structural materials for aircraft has been very difficult in the field of fiber reinforced composite materials.

In light of the foregoing, a partially impregnated prepreg has been proposed where the resin viscosity after heating and molding is controlled in consideration of the fluidity of the resin during the pressure reducing process. (For example, refer to patent document 3.) However, the resin viscosity is too high at room temperature so handling of the prepreg is difficult. In addition, diaminodiphenyl sulfone is not included in the epoxy resin composition, and the amount of tetraglycidyl amine type epoxy resin added is small, so the adhesion between the reinforcing fibers and the matrix resin and the environmental resistance such as the compressive strength at high temperatures after absorbing moisture are inferior, and thus are not suitable for use in structural materials of aircraft.

On the other hand, an epoxy resin composition containing dicyandiamide and a urea compound, as well as a prepreg thereof has been proposed in order to greatly reduce the energy consumption by low temperature cure of a prepreg that uses a matrix resin containing tetraglycidyl amine type epoxy resin and aminodiphenyl sulfone as a hardener (for example, refer to patent document 4 and patent document 5). However, US 2006-035088A1 introduces an epoxy resin composition and prepreg that uses a compression molding method and is specialized for general industry. This epoxy resin composition contains little tetraglycidyl amine type epoxy resin, which cannot provide strong adhesion between the reinforcing fibers and the matrix resin, and cannot provide mechanical properties and environmental resistance suitable for structural materials for aircraft. In addition, the molding method is compression molding that uses high temperatures, high pressures, and expensive equipment, so there are problems with reducing costs. In addition, the molding method uses high pressure, and there is no mention or suggestion of a method for reducing trapped air during lamination necessary for achieving low voids, nor of a method for restricting the generation of water vapor due to the epoxy resin composition, and a fiber reinforced composite material obtained by curing a prepreg containing this epoxy resin composition using only vacuum and an oven will have difficulty achieving low voids. JP2000-17090 discloses a prepreg specialized for autoclave molding at low temperature. However, in order to achieve low voids by curing with a vacuum pump and oven, both the trapped air during lamination must be reduced and handling of the prepreg must be seriously considered, and furthermore a specific room temperature viscosity range is necessary. Yet, none of these have been mentioned or discussed. In addition, the water vapor from the epoxy resin composition causes the formation of voids, and although there is a need to suppress the formation of water vapor and for the matrix resin to begin curing at a specific temperature range, there is no mention nor suggestion of this, and there is no mention whatsoever about a method for achieving low voids.

[Patent document 1] JP2004-050574A2
[Patent document 2] U.S. Pat. No. 6,391,436B1
[Patent document 3] JP2008-088276A2
[Patent document 4] US2006-0035088A1
[Patent document 5] JP2000-017090A2

SUMMARY OF THE INVENTION

In order to resolve all of the aforementioned problems and as a result of diligent research into the void formation mechanism in fiber reinforced composite materials, the present inventors have discovered an epoxy resin composition with a specific room temperature viscosity range that can provide both an ease of prepreg handling and reduced trapped air during lamination, and have discovered a specific viscosity range at a specific curing temperature to minimize the amount of water vapor formed by the epoxy resin composition while ensuring resin fluidity for removing as much water vapor and trapped air as possible to the outside of the molded panel, and sufficiently impregnating as much as possible the unimpregnated reinforcing fibers during cured. The surprising result was the conception of an epoxy resin composition for fiber reinforced composite materials and a prepreg thereof capable of producing a fiber reinforced composite material that provides excellent mechanical properties and heat resistance suitable to use as structural materials for an aircraft, that does not lose environmental resistance, that can be molded in a low cost process in a short period of time using only a vacuum pump and an oven, and that has panel quality comparable to parts produced by an autoclave.

The epoxy resin composition for a fiber reinforced composite material of the present invention is an epoxy resin composition, comprising components (A), (B), (C), and (D), wherein the epoxy resin composition has a viscosity at 40° C. of about $1 \times 10^3$ to about $1 \times 10^4$ Pa·s, a curing start temperature of about 90 to about 110° C., and a minimum viscosity at the curing start temperature of about 2 to about 20 Pa·s, wherein the components (A), (B), (C), and (D) comprise:
(A) About 60 weight parts or more of a tetraglycidyl amine type epoxy resin per 100 weight parts of the epoxy resin blend
(B) Dicyandiamide;
(C) Diaminodiphenyl sulfone and
(D) Urea compound Furthermore, the prepreg of the present invention contains a reinforcing fiber and the aforementioned epoxy resin composition for fiber reinforced composite materials.

Furthermore, the manufacturing method of the fiber reinforced composite material of the present invention is a manufacturing method, comprising:
laminating the prepreg including degassing the aforementioned prepreg at a temperature between about 20° C. and about 50° C. and at a degree of vacuum of about 0.09 MPa or more; and
increasing the temperature to a final curing temperature while maintaining the degree of vacuum at about 0.09 MPa or more.

Furthermore, the manufacturing method for the fiber reinforced composite material includes a manufacturing method, wherein the epoxy resin composition of the aforementioned prepreg is maintained at a temperature between about 60° C. and about 120° C., and after the epoxy resin composition has gelled, performing a step curing up to the final curing temperature.

DESCRIPTION OF THE PREFERRED EMBODIMENT

The epoxy resin composition for a fiber reinforced composite material of the present invention is an epoxy resin composition, comprising components (A), (B), (C), and (D), wherein the epoxy resin composition has a viscosity at 40° C. of about $1 \times 10^3$ to about $1 \times 10^4$ Pa·s, a curing start temperature of about 90 to about 110° C., and a minimum viscosity at the curing start temperature of about 2 to about 20 Pa·s, wherein the components (A), (B), (C), and (D) comprise:
(A) About 60 weight parts or more of a tetraglycidyl amine type epoxy resin per 100 weight parts of the epoxy resin blend
(B) Dicyandiamide;
(C) Diaminodiphenyl sulfone and
(D) Urea compound.

Of glycidyl type epoxy resins such as glycidyl ether type epoxy resins and glycidyl amine type epoxy resins, glycidyl amine type epoxy resins are effective as the main ingredient of component (A) of the present invention from the perspective of enhancing the adhesion to the reinforcing fiber, and in particular, glycidyl amine type epoxy resins with 2 glycidyl amino groups in repeating units corresponding to a single monomer molecule (hereinafter referred to as repeating units), or in other words, tetraglycidyl amine type epoxy resins are more effective. Compounds with one glycidyl amino group in each repeating unit tend to have inferior adhesion between the reinforcing fiber and the matrix resin, and compounds with three or more glycidyl amino groups in each repeating unit have inferior toughness of the matrix resin, and therefore a fiber reinforced composite material with high impact resistance will not be obtained. Examples of tetraglycidyl amine type epoxy resin include tetraglycidyl metaxylene diamine, tetraglycidyldiaminodiphenylmethane, tetraglycidyl diaminophenyl sulfone, tetraglycidyl diaminodiphenyl ether, tetraglycidyl bisamino methyl cyclohexane, tetraglycidyl aminophenyldiisopropyl benzene as well as blends thereof, but of these, tetraglycidyl diaminodiphenyl methane is preferably used for being remarkably effective at enhancing the adhesion between the reinforcing fibers and the matrix resin, and enhancing the mechanical properties, heat resistance, and environmental resistance of the composite material obtained. Commercial examples of tetraglycidyl diaminodiphenyl methanes include ELM434 (manufactured by Sumitomo Chemical), Araldite (registered trademark) MY720, Araldite (registered trademark) MY721, Araldite (registered trademark) MY725, Araldite (registered trademark) MY722, Araldite (registered trademark) MY9555, Araldite (registered trademark) MY9512, Araldite (registered trademark) MY9612, Araldite (registered trademark) MY9634, Araldite (registered trademark) MY9663 (manufactured by Huntsman Advanced Materials), Epotohto YH-434 (manufactured by Tohto Kasei), and Epicoat 604 (manufactured by Japan Epoxy Resin) and the like. The formulation amount of these resins must be 60 weight parts or higher, preferably 70 weight parts or higher, per 100 weight parts of epoxy resin blend. If the formulation amount is less than 60 weight parts, the adhesion between the reinforcing fibers and the matrix resin will not be sufficient, and the fiber reinforced composite material obtained will not be able to provide mechanical properties suitable for use in the structural materials of aircraft. Furthermore, when immersed in water, sufficient adhesion will not be obtained between the reinforcing fibers and the matrix resin, so moisture will permeate into the interface region between the reinforcing fibers and the matrix resin, adhesive force in the interface region cannot be maintained, and the environmental resistance of the composite material will be lost. Furthermore, the specific room temperature viscosity range will not be achievable for an epoxy resin composition of the present invention that can provide both prepreg handling properties and a reduction of trapped air during lamination, and many voids will be formed in the fiber reinforced composite material obtained. Furthermore, if an epoxy resin other than a tetraglycidyl amine type epoxy resin is included in component (A) as described below, the formulation amount of tetraglycidyl amine type epoxy resin in component (A) shall be 95 weight parts or less.

Furthermore, the following epoxy resins other than tetraglycidyl amine type epoxy are added as necessary to component (A) along with the aforementioned tetraglycidyl amine type epoxy resin.

Examples include bisphenol A type epoxy resins such as bisphenol A type epoxy resins, bisphenol F type epoxy resins, and bisphenol S type epoxy resins; novolac type epoxy resins such as cresol novolac type epoxy resins, and phenol novolac type epoxy resins; glycidyl aniline type epoxy resins, tetraglycidyl ether type epoxy resins, amino phenol type epoxy resins triglycidyl ether type epoxy resins, resorcinol type epoxy resins, naphthalene type epoxy resins, phenolaralkyl type epoxy resins, biphenyl type epoxy resins, fluorene type epoxy resins, dicyclopentadiene type epoxy resins, epoxy resins having a oxazolidone ring, urethane modified epoxy resins, and isocyanate modified epoxy resins and the like, as well as blends thereof.

Of these, bisphenol epoxy resins are preferably used in order to improve the toughness of the matrix resin while maintaining the adhesion to the reinforcing fibers at a high-level. Examples of commercial bisphenol A type epoxy resins include jER (registered trademark) 825, jER (registered trademark) 826, jER (registered trademark) 827, jER (registered trademark) 828 (manufactured by Japan Epoxy Resins K.K.), Epiclon (registered trademark) 850 (manufactured by DIC Corp.), Epotohto (registered trademark) YD-128 (manufactured by Tohto Kasei K.K.), DER331, DER-332 (manufactured by Dow Chemical), Bakelite (registered trademark) EPR154, Bakelite (registered trademark) EPR162, Bakelite (registered trademark) EPR172, Bakelite (registered trademark) EPR173, Bakelite (registered trademark) EPR174 (manufactured by Bakelite AG), and Araldite (registered trademark) LY1556 and the like. Examples of commercial bisphenol F type epoxy resins include jER (registered trademark) 806, jER (registered trademark) 807, jER (registered trademark) 1750, (manufactured by Japan Epoxy Resins K.K.), Epiclon (registered trademark) 830 (manufactured by DIC Corp.), Epotohto (registered trademark) YD-170, Epotohto (registered trademark) YD-175 (manufactured by Tohto Kasei K.K.), Bakelite (registered trademark) EPR169 (manufactured by Bakelite AG), and GY281, GY282, and GY285 (manufactured by Huntsman Advanced Materials) and the like.

Furthermore, a novolac type epoxy resin is preferably used for the effect of adjusting the tack of the prepreg at room temperature while maintaining the heat resistance and environmental resistance of the resin reinforced composite material obtained. Examples of commercial phenol novolac type epoxy resins include jER (registered trademark) 152, jER (registered trademark) 154, (manufactured by Japan Epoxy Resins K.K.), Epiclon (registered trademark) 740 (manufactured by DIC Corp.), Araldite (registered trademark) EPN1179, and Araldite (registered trademark) EPN1180 (manufactured by Huntsman Advanced Materials) and the like.

An aminophenol type epoxy resin is preferably used in order to further increase the adhesion to the reinforcing fibers and enhance the mechanical properties such as compressive strength while maintaining the heat resistance of the fiber reinforced composite material obtained. Examples of commercial aminophenol type epoxy resins include Araldite (registered trademark) MY0500, Araldite (registered trademark) MY0510, Araldite (registered trademark) MY0600, and Araldite (registered trademark) MY0610 (manufactured by Huntsman Advanced Materials) and the like.

Furthermore, a glycidylaniline type epoxy resin is preferably used in order to further increase the adhesion to the reinforcing fibers and enhance the mechanical properties such as compressive strength while maintaining the heat resistance and environmental resistance of the fiber reinforced composite material obtained. Examples of commercial glycidylaniline include GAN, GOT (manufactured by Nippon Kayaku K.K.) and Bakelite (registered trademark), EPR493 (manufactured by Bakelite AG), and the like.

The amount of epoxy resin other than tetraglycidyl amine type epoxy resin added to component (A) is between 5 and 40 weight parts, preferably between 10 and 30 weight parts, and more preferably between 20 and 30 weight parts, per 100 parts of epoxy resin composition.

If the amount of epoxy resin other than tetraglycidyl amine type epoxy resin is too small, the impact resistance of the fiber reinforced composite material may be insufficient, but if the amount is too high, the mechanical properties such as compressive strength of the fiber reinforced composite material may be reduced.

Component (B) of the present invention is dicyandiamide. In the present invention, the dicyandiamide (hereinafter abbreviated as DICY is a fine solid particle compound belonging to amine type hardeners, and is difficult to dissolve in epoxy resin composition corresponding to bulk at low temperatures, but dissolves at high temperature and begins to react with the epoxy resin. Therefore, epoxy resin compositions and prepregs that use DICY as a hardener will have particularly favorable storage stability. Furthermore, the amount of DICY added to 100 weight parts of the epoxy resin composition may be between 2 and 10 weight parts, and is more preferably between 3 and 8 weight parts. If the formulation amount is too small, the adhesion between the reinforcing fibers and the matrix resin will be reduced and the mechanical properties of the fiber reinforced composite material may be reduced, but if the formulation amount is too high, the moisture absorption and the heat resistance and environmental resistance of the fiber reinforced composite material obtained will be reduced.

The average particle size of the DICY is preferably between 1 and 15 µm, more preferably between 3 and 13 µm, and even more preferably between 5 and 10 µm. If the average particle size of the DICY is too small, dissolution of the DICY into the epoxy resin composition will be excessively accelerated, and the curing reaction will proceed even at temperatures close to room temperature, and thus the storage stability of the epoxy resin composition and the prepreg will be lost. Furthermore, if the average particle size of the DICY is too large, the curing reaction will not sufficiently proceed even at the curing temperature, and the epoxy resin composition may experience improper curing.

Component (C) of the present invention is diaminodiphenyl sulfone. With the present invention, the diaminodiphenyl sulfone (hereinafter abbreviated as DDS) is a fine particle compound belonging to aromatic amine hardeners, and structural isomers exist because of the substitution positions of the amino group on the aromatic ring. With the present invention, any isomer may be used, but the physical properties of the matrix resin and the fiber reinforced composite material can be controlled by changing the type of isomer. For example, with 4,4'-DDS, in particular, the impact resistance and heat resistance of the fiber reinforced composite material obtained will be excellent, but with 3,3'-DDS, in particular, the stiffness of the fiber reinforced composite material obtained will be excellent. Furthermore, the amount of DDS added to 100 weight parts of the epoxy resin composition may be between 5 and 50 weight parts, and is more preferably between 5 and 30 weight parts. If the formulation amount is too small, it is possible that the adhesion between the reinforcing fibers and the matrix resin will be reduced, the mechanical properties of the fiber reinforced composite material will be reduced, the stiffness, heat resistance, and heat resistance after absorbing moisture of the matrix resin will be insufficient, and the mechanical properties, heat resistance, and environmental resistance of the fiber reinforced composite material obtained will be reduced. If the formulation amount is too high, the reactivity of the matrix resin will be reduced, and there is a possibility that many voids will be included in the fiber reinforced composite material obtained. The average particle size of the DDS is preferably between 1 and 15 µm, more preferably between 3 and 13 µm, and even more preferably between 5 and 13 µm, for the same reasons as the DICY.

By using DDS together with DICY as the hardener, the reinforcing fibber and the matrix resin will more firmly adhere, and in particular, the heat resistance, the mechanical properties such as compressive strength, and environmental resistance of the fiber reinforced composite material obtained will be markedly enhanced.

A prepreg containing epoxy resin composition with between 3 and 8 weight parts of DICY and between 5 and 30 weight parts of DDS per 100 weight parts of epoxy resin composition can provide a fiber reinforced composite material with more excellent heat resistance, environmental resistance, and mechanical properties such as compressive strength because the adhesive effect to the reinforcing fibers will be prominently expressed.

Component (D) of the present invention is a urea compound. When a urea compound is used as an accelerator, an excellent epoxy resin composition that can provide both storage stability and adhesion to the reinforcing fibers can be provided. If a tertiary amine compound is used in place of the urea compound as the accelerator, the storage stability of the epoxy resin composition and the prepreg will be inferior, and if an imidazole compound is used, the adhesion between the reinforcing fibers in the matrix resin will tend to be inferior. Examples of urea compounds include 3-phenyl-1, 1-dimethyl urea, 3-(3-chlorophenyl)-1,1,-dimethyl urea, 3-(3,4-dichlorophenyl)-1,1-dimethyl urea, 2,4-toluene bisdimethyl urea, and 2,6-toluene bisdimethyl urea and the like, as well as blends thereof. Of these, 2,4-toluene bisdimethyl urea not only can provide excellent storage stability for the matrix resin, curing acceleration for the matrix resin, and adhesion to the reinforcing fibers but surprisingly, can also provide an excellent fiber reinforced composite material with a low voids comparable to that of an autoclave.

Furthermore, the formulation amount of urea compound in 100 weight parts of epoxy resin composition is preferably between 1 and 10 weight parts, more preferably between 2 and 9 weight parts, and even more preferably between 3 and 8 weight parts. If the formulation amount of urea compound is too low, the adhesion between the reinforcing fibers in the matrix resin will be reduced, the acceleration effect will be insufficient, the mechanical properties such as compressive strength of the fiber reinforced composite material obtained will be reduced, and there is a possibility that many voids will be formed due to the water content in the fiber reinforced composite material obtained. If the formulation amount of urea compound is too high, there is a possibility that the accelerating effect will be excessive, the storage stability of the epoxy resin composition and the prepreg will be lost, and the fluidity of the matrix resin will be too low so many voids will be formed in the fiber reinforced composite material obtained.

The epoxy resin composition is preferably used by blending and dissolving in a thermoplastic resin in addition to the aforementioned components, in order to provide improved effects such as enhancing the toughness and stiffness of the matrix resin, controlling the tack, and enhancing the adhesion between the reinforcing fibers and the matrix resin. These thermoplastic resins are generally thermoplastic resins which have a bond selected from carbon-carbon bonds, amide bonds, imide bonds, ester bonds, ether bonds, carbonate bonds, urethane bonds, thioether bonds, sulfone bonds, and carbonyl bonds, but it is also acceptable to have a partially cross-linked structure. Furthermore, the thermoplastic resins be crystalline or amorphous. In particular, at least one type of thermoplastic resin is used, selected from the group consisting of polyamides, polycarbonates, polyacetals, polyphenylene oxides, polyphenylene sulfides, polyarylates, polyesters, polyamideimides, polyimides, polyetherimides, polyimides with a phenyltrimethylindane structure, polysulfones, polyethersulfones, polyetherketones, polyetheretherketones, polyaramids, polyethernitriles, and polybenzimidazoles. These thermoplastic resins can be commercial polymers, or so-called oligomers with a lower molecular weight than commercial polymers. The oligomers are preferably oligomers with a functional group that can react with the thermosetting resin either at the terminus or in the molecular chain.

Furthermore, the formulation amount of these thermoplastic resins is preferably between 5 and 30 weight parts, more preferably between 8 and 25 weight parts, and even more preferably between 10 and 25 weight parts, per 100 weight parts of epoxy resin composition. If the formulation amount of thermoplastic resin is too low, there is a possibility that improvement effects such as enhanced stiffness and toughness of the matrix resin, tack control, and enhanced adhesion between the reinforcing fibers and the matrix resin will not be obtained, but if the formulation amount of the thermoplastic resin is too high, there is a possibility that the heat resistance and stiffness of the matrix resin will be lost.

The viscosity of the epoxy resin composition of the present invention at 40° C. must be between $1 \times 10^3$ and $1 \times 10^4$ Pa·s, preferably between $2 \times 10^3$ and $6 \times 10^3$ Pa·s, and more preferably between $2 \times 10^3$ and $4 \times 10^4$ Pa·s, in order to achieve both handling properties of the prepreg and reduced trapped air during lamination. If the viscosity at 40° C. is too low, the resin film required for producing the prepreg cannot be produced, the handling properties of the prepreg will be inferior, and there will be problems with workability because the tack will be too high when laminating the prepreg. Furthermore, when gassing, the air that is trapped during lamination will not be released and many voids will form in the fiber reinforced composite material obtained. If the viscosity at 40° C. is too high, there will be problems with workability in that the tack will be reduced and cannot be laminated in the mold, and in addition, when a resin film required for fabricating the prepreg is formed, the viscosity will be too high so higher temperature will be required for film forming, a resin film will not be able to be formed, and the storage stability of the prepreg obtained will be lost.

Furthermore, the curing start temperature of the epoxy resin composition of the present invention must be between 90 and 110° C., preferably between 93 and 110° C., and more preferably between 95 and 108° C. If the curing start temperature is too low, the storage stability of the prepreg obtained will be lost. If the curing start temperature is too high, the formation of water vapor due to the matrix resin cannot be suppressed simply by the pressure during vacuum, and many voids will form in the fiber reinforced composite material obtained. Herein, the curing start temperature is determined by the following method. Namely, measurements are performed using a dynamic viscoelasticity measuring device (ARES, manufactured by TA Instruments) using parallel plates while simply increasing the temperature at a rate of 2° C./min, with a strain of 100%, frequency of 0.5 Hz, and plate gap of 1 mm, from 40° C. to 130° C., and the curing start temperature is defined as the temperature when the minimum viscosity is reached.

Furthermore, the minimum viscosity at the start of curing of the epoxy resin composition of the present invention must be between 2 and 20 Pa·s, preferably between 3 and 15 Pa·s, and more preferably between 4 and 10 Pa·s. If the minimum viscosity is too low, the fluidity of the matrix resin will be too high, and the desired resin content will not be achieved in the fiber reinforced composite material obtained. If the minimum viscosity is too high, it will not be possible to ensure a resin viscosity that allows escape of the maximum amount of water vapor caused by the matrix resin and air trapped during lamination to the outside of the molded panel during curing, and many voids will form in the fiber reinforced composite material obtained. Herein, 40° C. and the minimum viscosity are determined by the following methods. Namely, measurements are performed using a dynamic viscoelasticity measuring device (ARES, manufactured by TA Instruments) using parallel plates while simply increasing the temperature at a rate of 2° C./min, with a strain of 100%, frequency of 0.5 Hz, and plate gap of 1 mm, from 40° C. to 130° C.

The epoxy resin composition of the present invention preferably has a flexure modulus at 25° C. between 3.5 and 4.5 GPa, more preferably between 3.8 and 4.3 GPa, and even more preferably between 4.0 and 4.3 GPa, for the cured resin obtained by curing for 2 hours at 130° C. If the flexure modulus is too low, the mechanical properties such as compressive strength of the fiber reinforced composite material obtained using this epoxy resin composition may be inferior, but if the flexure modulus is too high, the toughness of the fiber reinforced composite material obtained may be inferior. The flexure modulus referred to herein can be measured by a three-point bending test in conformance with JIS K 7171-1994.

The heat resistance of the cured resin has a positive correlation to the heat resistance of the fiber reinforced composite material, and therefore it is important to use a cured resin with high heat resistance in order to obtain a fiber reinforced composite material with high heat resistance. The glass transition temperature is commonly used as an indicator of the heat resistance because when the temperature of the ambient air exceeds the glass transition temperature, the mechanical properties of the cured resin and the fiber reinforced composite material will be greatly reduced. Furthermore, the glass transition temperature of the cured resin after absorbing moisture is commonly used as an indicator of the mechanical properties of the fiber reinforced composite material under high-temperature environments or at room temperature after absorbing moisture, or in other words, so-called environmental resistance.

The epoxy resin composition of the present invention preferably has a glass transition temperature of 150° C. or higher, more preferably 155° C. or higher, for the cured resin obtained by curing for 2 hours at 130° C. If the heat resistance is too low, there is a possibility that the glass transition temperature after water absorption of the cured resin obtained from this epoxy resin composition will be greatly reduced. Furthermore, the glass transition temperature after the cured resin obtained by curing the epoxy resin composition for 2 hours at 130° C. is immersed in boiling water for 24 hours is preferably 120° C. or higher, and more preferably 125° C. or higher. If the heat resistance is too low, there is a possibility that the mechanical properties such as compressive strength at high temperature after water absorption of the fiber reinforced composite material obtained using this epoxy resin composition will be greatly reduced. The glass transition temperature of the cured resin referred to herein is measured using a dynamic viscoelasticity measuring device (ARES, manufactured by TA Instruments) in accordance with SACMA SRM 18R-94. However, the measurement shall be performed in Rectangular Torsion mode, the measurement vibration frequency shall be 1 Hz, and the rate of temperature rise shall be 5° C./minute. The glass transition temperature is determined by finding the intersection between the tangent line of the glass region and the tangent line of the transition region from the glass region to the rubber region on the temperature-storage elasticity modulus curve, and the glass transition temperature is considered to be the temperature at that intersection.

The prepreg of the present invention can be a prepreg where the epoxy resin composition of the present invention is completely impregnated into the reinforcing fiber, or can be a partially impregnated prepreg where a portion of the reinforcing fiber is not impregnated and the remaining portion of the reinforcing fiber epoxy with some composition of the present invention. For the case of a partially impregnated prepreg, the impregnation ratio of epoxy resin composition in the prepreg is preferably between 30 and 95%, more preferably between 30 and 85%, and even more preferably between 50 and 80%. If this impregnation ratio is too low, peeling will occur between the reinforcing fibers and the epoxy resin composition, and the tack of the prepreg will be too high, so there is a possibility that the workability will be inferior. If the impregnation ratio is too high, the air paths through the reinforcing fiber layer may be insufficient, and many voids may be formed in the fiber reinforced composite material obtained. Note, the impregnation ratio % of the epoxy resin composition in the prepreg herein can be calculated by hardening the resin in the prepreg without allowing flow, observing the cross-section after curing using a microscope, and determining the ratio cross-sectional area of all reinforcing fibers to the cross-sectional area of the reinforcing fibers impregnated with epoxy resin composition.

Furthermore, the prepreg of the present invention can be manufactured by applying the epoxy resin composition of the present invention onto a release paper using a reverse roll coater or a knife coater or the like to form a film, and then impregnating the epoxy resin composition film on both sides of the reinforcing Fibers by overlaying, heating, and compressing. Furthermore, a prepreg that is completely covered with matrix resin only on one side can be manufactured by overlaying the epoxy resin composition film on only one side of the reinforcing fibers and then heating and compressing to impregnate. This prepreg contains reinforcing fibers where one side is not impregnated with matrix resin, and therefore this side can act as an airpath, so there is an effect of reducing voids in the fiber reinforced composite material obtained. Herein, a partially impregnated prepreg can be manufactured by adjusting the conditions downward during impregnation such as temperature, pressure, and time, such that a portion of the reinforcing fibers are not impregnated with epoxy resin composition. Alternatively, partially impregnated prepreg can also be manufactured using a film where the epoxy resin composition coated on the release paper has a shape that does not completely cover the release paper, such as a striped pattern.

The reinforcing fibers that are used in the prepreg of the present invention can be glass fibers, Kevlar fibers, carbon fibers, graphite fibers, or boron fibers or the like. Of these, carbon fibers are preferable from the perspective of specific strength and specific modulus.

With the prepreg of the present invention, the amount of reinforcing fibers per unit area is preferably between 100 and 300 g/m$^2$. If the amount of reinforcing fibers is low, the number of lamination layers required to obtain the desired thickness will need to increase, and the operation may become complex, but if the amount of reinforcing fibers is too high, the draping properties of the prepreg may be inferior.

The prepreg of the present invention preferably has fiber weight content between 30 and 80%, more preferably between 35 and 70%, and even more preferably between 40 and 65%. If the fiber weight content is too low, the amount of matrix resin will be too high, and the advantages of a fiber reinforced composite material with excellent specific strength and specific modulus will not be achieved, but if the fiber weight content is too high, improper impregnation will occur because of insufficient resin, and there is a possibility that a large number of voids will form in the fiber reinforced composite material obtained.

Examples of the shape and orientation of the reinforcing fibers of the present invention include long fibers aligned in one direction also known as unidirectional, multiaxial fabrics, nonwoven materials, mats, knit, and braids and the like, and these can be freely selected depending on the application and region of use.

Multiaxial fabrics comprise plain, twill and Sateen weave fabrics. These fabrics have a window area of 0 to 10% for increasing the permeability and reducing the outgas time.

The fiber reinforced composite material of the present invention can be manufactured by laminating and thermal curing the aforementioned prepreg. Naturally, a fiber reinforced composite material can be obtained by carrying a single layer prepreg. Heating is performed by a device such as an oven, autoclave, or press or the like. From the perspective of low cost, an oven is preferably used. If the prepreg of the present invention is heated and cured in an oven a molding method is used where a single layer of prepreg or a laminate body formed by laminating a plurality of layers is formed, and the laminate body obtained is bagged and degassed at a temperature between 20 and 50° C. where the degree of vacuum inside the bag is 0.09 MPa or more, and the temperature is raised to the curing temperature while maintaining the degree of vacuum at 0.09 MPa or more. If the degree of vacuum is smaller than 0.09 MPa, the vacuum in the back cannot be sufficiently ensured and a large number of voids may be formed in the fiber reinforced composite material obtained. Herein, the curing temperature is preferably between 100 and 180° C., and more preferably between 120 and 140° C. If the curing temperature is too low, the curing time will be long, which may lead to high costs, but if the curing temperature is too high, the thermal shrink while cooling from the curing temperature to room temperature cannot be ignored, and there is a possibility that the mechanical properties of the fiber reinforced composite material obtained will be inferior.

When raising the temperature from room temperature to the curing temperature, the temperature can be raised at a constant rate up to the curing temperature, or the temperature can be maintained at an intermediate temperature for a fixed period of time and then increased to the curing temperature. In the case of step curing where the temperature is held at an intermediate temperature for a fixed period of time as described above, a method is preferably used where the temperature is maintained between 60 and 120° C. for a fixed period of time and after the epoxy resin composition of the present invention has gelled, the temperature is raised to the final curing temperature. In this manner, when the temperature is raised to the final curing temperature after gelling, even if new water vapor due to the epoxy resin composition is formed while raising the temperature, the surrounding epoxy resin composition is gelled, so the water vapor can be prevented from going into large void, and therefore this is preferable.

Furthermore, the temperature maintained for the fixed period of time is preferably between 60 and 120° C., more preferably between 70 and 100° C., and even more preferably between 85 and 95° C. If the temperature that is maintained for a fixed period of time is too low, the time required until gelling of the epoxy resin composition of the present invention will be much longer, and this may lead to high molding costs, a resin fluidity that allows release of a maximum amount of air that is trapped during lamination will not be achieved, and there is a possibility that a large number of voids will be formed in the fiber reinforced composite material obtained, but conversely if the temperature is too high, epoxy resin composition can sufficiently harden so that the effect of maintaining the temperature for a fixed period of time may be minimal.

The present invention is described below in further detail using working examples. The following materials were used to obtain the prepreg for each working example.

(Carbon Fibers)

Torayca (registered trademark) T700G-12K-31E (carbon fibers manufactured by Toray K.K. with a fiber count of 12,000, tensile strength of 4.9 GPa, tensile elasticity of 240 GPa, and tensile elongation of 2.0%)

Torayca (registered trademark) T700S-12K-50C (carbon fibers manufactured by Toray K.K. with a fiber count of 12,000, tensile strength of 4.9 GPa, tensile elasticity of 230 GPa, and tensile elongation of 2.1%)

(Epoxy Resin)

Bisphenol A type epoxy resin, Araldite (registered trademark) LY1556 (manufactured by Huntsman Advanced Materials)

Tetraglycidyldiaminodiphenylmethane, Araldite (registered trademark) MY9655 (manufactured by Huntsman Advanced Materials)

Phenol novolac type epoxy resin, Araldite (registered trademark) EPN1180 (manufactured by Huntsman Advanced Materials)

Diglycidyl aniline, GAN (manufactured by Nippon Kayaku K.K.)

(Thermoplastic Resin)

Polyethersulfone with a terminal hydroxyl group, Sumikaexcel (registered trademark) PES5003P (manufactured by Sumitomo Chemical K.K.)

(Hardener)

Dicyandiamide, Dyhard (registered trademark) 100S (manufactured by Alz Chem Trostberg GmbH)

4,4'-diaminodiphenylsulfone, Aradur (registered trademark) 9664-1 (manufactured by Huntsman Advanced Materials)

(Accelerator)

2,4-toluene bisdimethyl urea, OMICURE (registered trademark) U-24 (manufactured by CVC Thermoset Specialties)

3-(3,4-dichlorophenyl)-1,1-dimethyl urea, Dyhard (registered trademark) UR200 (manufactured by Alz Chem Trostberg GmbH)

The following measurement methods were used to measure the epoxy resin composition and the prepreg for each working example.

(1) Epoxy Resin Composition Viscosity Measurement

The epoxy resin composition was measured using a dynamic viscoelasticity measuring device (ARES, manufactured by TA Instruments) using parallel plates while simply increasing the temperature at a rate of 2° C./min, with a strain of 100%, frequency of 0.5 Hz, and plate gap of 1 mm, from 40° C. to 130° C. The temperature when the minimum viscosity is reached is used as the curing start temperature.

(2) Elastic Modulus of Cured Epoxy Resin

The temperature on the epoxy resin composition was increased at a rate of 1.5° C./min up to 130° C. and cured for 120 minutes to produce a resin plate with a thickness of 2 mm. Next, the resin plate was cut to a length of 60 mm and a width of 10 mm, and then measured using a three-point bending test in conformance with JIS K7171-2008.

(3) Glass Transition Temperature and Glass Transition Temperature after Moisture Absorption of Cured Epoxy Resin The temperature on the epoxy resin composition was increased at a rate of 1.5° C./min up to 130° C. and cured for 120 minutes to produce a resin plate with a thickness of 2 mm. Next, the resin plate was cut to a length of 60 mm and a width of 10 mm. The glass transition temperature of the resin plate was measured using a dynamic viscoelasticity measuring device (ARES, manufactured by TA Instruments) in accordance with SACMA SRM 18R-94. When measuring the glass transition temperature after moisture absorption, the 60 mm long the 10 mm wide resin plate was immersed in boiling water for 24 hours. The measurement was taken using a dynamic viscoelasticity measuring device (ARES, manufactured by TA Instruments) in accordance with SACMA SRM 18R-94. However, the measurement was performed in Rectangular Torsion mode, the measurement vibration frequency was 1 Hz, and the rate of temperature rise was 5° C./minute. The glass transition temperature was determined by finding the intersection between the tangent line of the glass region and the tangent line of the transition region from the glass region to the rubber region on the temperature-storage elasticity modulus curve, and the temperature at that intersection was considered to be the glass transition temperature.

(4) Fiber Reinforced Composite Material Compressive Strength Measurement

Eight ply of unidirectional prepreg were laminated in a [0°] structure and degassed at 25° C. and a degree of vacuum of 0.095 MPa, and then the degree of vacuum was maintained at 0.095 MPa while the temperature was increased at a rate of 1.5° C. to temperature of 130° C. and maintained for 120 minutes to cure the prepreg and produce a laminate body 300 mm long and 300 mm wide. The compressive strength of the fiber reinforced composite material was determined from this laminate body in accordance with SACMA SRM 1R-94.

(5) Fiber Reinforced Composite Material Void Ratio Measurement

Sixteen ply of unidirectional prepreg were laminated in a [0°] structure and degassed at 25° C. and a degree of vacuum of 0.095 MPa, and then the degree of vacuum was maintained at 0.095 MPa while the temperature was increased at a rate of 1.5° C. to temperature of 130° C. and maintained for 120 minutes to cure the prepreg and produce a laminate body 300 mm long and 150 mm wide. A 10 mm long×10 mm wide sample was cut from this laminate body, and the cross-section was polished, and then a photograph was taken using an optical microscope at a zoom of 50× or higher such that the top and bottom surfaces of the laminate body fit within the viewing field. The surface area ratio of voids with regards to the cross-sectional area was calculated and used as the void ratio.

(6) Measurement of Impregnation Ratio of Epoxy Resin Composition in Prepreg

The prepreg was sandwiched between two surfaces of smooth polytetrafluorinated ethylene resin plates and bonded, gradually cured at 40 to 130° C. for 10 days to produce plate-like cured resin. After curing, a cut was made from a direction orthogonal to the adhesive surface, a photograph was taken of the cross-section using an optical microscope at a zoom of 50× or higher such that the top and bottom surfaces of the prepreg fit within the viewing field. The surface area ratio of the resin impregnated part with regards to the cross-sectional area was calculated and used as the impregnation ratio of the epoxy resin composition in the prepreg.

Working Example 1

10 weight parts of PES5003P added and dissolved in 90 weight parts of Araldite (registered trademark) MY9655 and 10 weight parts of Araldite (registered trademark) LY1556 in a kneader, and then 3 weight parts of Dyhard (registered trademark) 100S as a hardener, 10 weight parts of Aradur (registered trademark) 9664-1 were kneaded in, and then 5 weight parts OMICURE (registered trademark) U-24 as an accelerator was kneaded in to produce an epoxy resin composition.

The produced epoxy resin composition was applied onto release paper using a knife coater to produce 2 sheets of 40.4 g/m² resin film. Next, the aforementioned 2 sheets of fabricated resin film were overlaid on both sides of unidirectionally oriented carbon fibers in the form of a sheet (T700G-12K-31E) and the resin was impregnated using a roller temperature of 120° C. and a roller pressure of 0.07 MPa to produce a unidirectional prepreg with a carbon fiber area weight of 150 g/m² and a matrix resin weight content of 35%.

The epoxy resin composition content in the prepreg, the compressive strength of the fiber reinforced composite material and the void ratio were measured using unidirectional prepreg that was produced. The results obtained are shown in Table 1.

Working Examples 2 Through 8 and 12 Through 17 and Comparative Examples 1 Through 4 and 6 Through 9

Prepregs were fabricated in a manner similar to working example 1 except that the types and amounts of carbon fibers, epoxy resin, thermoplastic resin, hardener, and accelerator were changed as shown in Table 1.

In comparative example 8, the viscosity of the epoxy resin composition was too high so a prepreg could not be fabricated.

The epoxy resin composition content in the prepreg, the compressive strength of the fiber reinforced composite material, and the void ratio were measured using unidirectional prepreg that was produced. The results obtained are shown in Table 1.

Working Example 9

10 weight parts of PES5003P added and dissolved in 70 weight parts of Araldite (registered trademark) MY9655 and 30 weight parts of Araldite (registered trademark) LY1556 in a kneader, and then 3 weight parts of Dyhard (registered trademark) 100S as a hardener, 10 weight parts of Aradur (registered trademark) 9664-1 were kneaded in, and then 5 weight parts OMICURE (registered trademark) U-24 as an accelerator was kneaded in to produce an epoxy resin composition.

The produced epoxy resin composition was applied onto release paper using a knife coater to produce two sheets of 40.4 g/m² resin film. Next, the aforementioned 2 sheets of fabricated resin film were overlaid on both sides of unidirectionally oriented carbon fibers in the form of a sheet (T700G-12K-31E) and the resin was impregnated using a roller temperature of 90° C. and a roller pressure of 0.07 MPa to produce a unidirectional prepreg with a carbon fiber area weight of 150 g/m2 and a matrix resin weight content of 35%. The epoxy resin composition content in the prepreg, the compressive strength of the fiber reinforced composite material, and the void ratio were measured using unidirectional prepreg that was produced. The results obtained are shown in Table 1.

Working Examples 10 and 11

Prepregs were fabricated similar to working example 9, except that the roller temperature was 70° C. in working example 10 and the roller temperature in working example 11 was 100° C. The epoxy resin composition content in the prepreg, the compressive strength of the fiber reinforced composite material, and the void ratio were measured using unidirectional prepreg that was produced. The results obtained are shown in Table 1.

Working Example 18

10 weight parts of PES5003P added and dissolved in 70 weight parts of Araldite (registered trademark) MY9655 and 30 weight parts of Araldite (registered trademark) LY1556 in a kneader, and then 3 weight parts of Dyhard (registered trademark) 100S as a hardener, 10 weight parts of Aradur (registered trademark) 9664-1 were kneaded in, and then 5 weight parts OMICURE (registered trademark) U-24 as an accelerator was kneaded in to produce an epoxy resin composition.

The produced epoxy resin composition was applied onto release paper using a knife coater to produce two sheets of 68.8 g/m² resin film. Next, the aforementioned 2 sheets of fabricated resin film were overlaid on both sides of a plain weave fabric made from T700S-12K-50C, and the resin was impregnated using a roller temperature of 100° C. and a roller pressure of 0.07 MPa to produce a unidirectional prepreg with a carbon fiber areal weight of 190 g/m2 and a matrix resin weight content of 42%. The epoxy resin composition content in the prepreg was measured using the plain weave fabric prepreg that was produced, and the result was 75%. The compressive strength measurement and the void ratio of the fiber reinforced composite material were measured and the results were 924 MPa and 0.7% respectively.

Working Example 19

The epoxy resin composition produced in working example 18 was applied onto release paper using a knife coater to produce one 137.6 g/m² resin film. Next, the aforementioned sheet of fabricated resin film was overlaid on one side of a plain weave fabric made from T700S-12K-50C, and the resin was impregnated using a roller temperature of 100° C. and a roller pressure of 0.07 MPa to produce a unidirectional prepreg with a carbon fiber areal weight of 190 g/m2 and a matrix resin weight content of 42%. The epoxy resin composition content in the prepreg was measured using the plain weave fabric prepreg that was produced, and the result was 77%. The compressive strength measurement and the void ratio of the fiber reinforced composite material were measured and the results were 953 MPa and 0.3% respectively.

Working Example 20

A unidirectional prepreg was fabricated by the same method as working example 1. When measuring the compressive strength and the void content of the fiber reinforced composite material using the fabricated unidirectional prepreg, a fiber reinforced composite material was fabricated using the following curing method that differed from working examples 1 through 18 and comparative examples 1 through 8. The measurement method made in evaluation using the aforementioned measurement methods of (4) and (5).

The lamination plate that was used for measuring the compressive strength was made by laminating 8 ply of unidirectional prepreg in a [0°] structure and degassed at 25° C. and a degree of vacuum of 0.095 MPa, and then the degree of vacuum was maintained at 0.095 MPa while the temperature was increased at a rate of 1.5° C. to a temperature of 90° C. and maintained for 90 minutes, and then increased at a rate of 1.5° C. to a temperature of 130° C. and maintained for 120 minutes to cure the prepreg and produce a laminate body 300 mm long and 300 mm wide.

The lamination plate that was used for measuring voids was made by laminating 16 ply of unidirectional prepreg in a [0°] structure and degassed at 25° C. and a degree of vacuum of 0.095 MPa, and then the degree of vacuum was maintained at 0.095 MPa while the temperature was increased at a rate of 1.5° C. to a temperature of 90° C. and maintained for 90 minutes, and then increased at a rate of 1.5° C. to a temperature of 130° C. and maintained for 120 minutes to cure the prepreg and produce a laminate body 300 mm long and 300 mm wide. The compressive strength measurement and the void ratio of the fabricated fiber reinforced composite material were measured and the results were 1497 MPa and 0.3% respectively.

Working Example 21

The epoxy resin composition produced in working example 18 was applied onto release paper using a knife coater to produce two 68.8 g/m² resin film. Next, the aforementioned sheets of fabricated resin film were overlaid on one side of a plain weave fabric made from T300B-3K, and the resin was impregnated using a roller temperature of 100° C. and a roller pressure of 0.07 MPa to produce a unidirectional prepreg with a carbon fiber areal weight of 190 g/m2 and a matrix resin weight content of 42%. The epoxy resin composition content in the prepreg was measured using the plain weave fabric prepreg that was produced, and the result was 77%. The compressive strength measurement and the void ratio of the fiber reinforced composite material were measured and the results were 706.0 MPa and 0.3% respectively.

Working Example 22

The epoxy resin composition produced in working example 18 was applied onto release paper using a knife coater to produce two 68.8 g/m² resin film. Next, the aforementioned sheets of fabricated resin film were overlaid on two sides of a plain weave fabric made from T300JB-3K-40B, and the resin was impregnated using a roller temperature of 100° C. and a roller pressure of 0.07 MPa to produce a unidirectional prepreg with a carbon fiber areal weight of 190 g/m2 and a matrix resin weight content of 42%. The epoxy resin composition content in the prepreg was measured using the plain weave fabric prepreg that was produced, and the result was 77%. The compressive strength measurement and the void ratio of the fiber reinforced composite material were measured and the results were 761.2 MPa and 0.3% respectively.

Working Example 23

The fabric used in working examples 18, 19 and 21 through 22 having a window area from 0.1-10%, preferably 0.5 to 5%, to increase the permeability thus reducing the outgas time for the prepreg.

Comparative Example 5

Prepregs were fabricated in a manner similar to working example 9 except that the types and amounts of carbon fibers, epoxy resin, thermoplastic resin, hardener, and accelerator were changed as shown in FIG. 1. The epoxy resin composition content in the prepreg, the compressive strength of the fiber reinforced composite material and the void ratio were measured using unidirectional prepreg that was produced. The results obtained are shown in Table 1.
Table 1

By comparing working examples 1 to 18 and comparative examples 1 through 9, it can be seen that the epoxy resin compositions of working examples 1 through 18 which have a specific room temperature viscosity range, a specific curing start temperature, and a specific viscosity range at the curing start time can provide excellent mechanical properties, heat resistance, and environmental resistance suitable for use in structural materials for aircraft, and can provide high panel quality comparable to that of an autoclave.

By comparing working example 2 and working examples 9 through 11, it can be seen that the void ratio of the fiber reinforced composite material is reduced by utilizing the un-impregnated portion of the reinforcing fibers as air path by reducing the impregnation ratio of the epoxy resin composition in the prepreg.

By comparing working examples 1 through 18 and comparative examples 2, 4, and 6 through 7, it can be seen that an epoxy resin composition that does not have a specific juror start temperature can not suppress the formation of water vapor caused by the epoxy resin composition, and thus a large number of voids are formed in the fiber reinforced composite material obtained.

By comparing working examples 1 through 3 and comparative example 1, it can be seen that the air trapped during lamination of the prepreg is reduced if the formulation amount of tetraglycidyl amine type epoxy resin is 60 weight parts or higher, and surprisingly that voids in the fiber reinforced composite material obtained can be reduced by optimizing the resin fluidity of the matrix resin.

By comparing working examples 2, and 4 through 5 with comparative examples 6 and 7 and working example 6, not only can excellent storage stability for the matrix resin, curing acceleration for the matrix resin, and adhesion to the reinforcing fibers be provided, but surprisingly, an excellent fiber reinforced composite material with a low voids comparable to that of an autoclave can be provided by adding the urea compound 2,4-toluene bisdimethyl urea in particular.

| | | | | Example | | | | | | |
|---|---|---|---|---|---|---|---|---|---|---|
| Item | | | Unit | 1 | 2 | 3 | 4 | 5 | 6 | 7 |
| Epoxy Resin Composition for Fiber Reinforced Plastics | Epoxy Resin Blend | (Essential Component A) | | | | | | | | |
| | | MY9655 | (Weight Parts) | 90 | 70 | 60 | 70 | 70 | 70 | 70 |
| | | LY1556 | (Weight Parts) | 10 | 30 | 40 | 30 | 30 | 30 | 30 |
| | | GAN | (Weight Parts) | | | | | | | |
| | | EPN1180 | (Weight Parts) | | | | | | | |
| | Thermoplastic Resin | SUMIKA EXCEL 5003P | (Weight Parts) | 10 | 10 | 10 | 10 | 10 | 10 | 10 |
| | Hardener | (Essential Component B) | | | | | | | | |
| | | Dyhard 100S | (Weight Parts) | 3 | 3 | 3 | 3 | 3 | 3 | 3 |
| | | (Essential Component C) | | | | | | | | |
| | | Aradur 9664-1 | (Weight Parts) | 10 | 10 | 10 | 10 | 10 | 10 | 5 |
| | Accelerator | (Essential Component D) | | | | | | | | |
| | | Omicure U-24 | (Weight Parts) | 5 | 5 | 5 | 3 | 8 | | 5 |
| | | Dyhard UR200 | (Weight Parts) | | | | | | 10 | |

-continued

| | | | | | | | | | | |
|---|---|---|---|---|---|---|---|---|---|---|
| Epoxy Resin Properties | Viscosity | Viscosity at 40° C. | (Pa · s) | 2396 | 2471 | 1862 | 2235 | 3563 | 4203 | 2017 |
| | | Minimum Viscosity | (Pa · s) | 9 | 6 | 4 | 4 | 11 | 11 | 5 |
| | | Curing Start Temperature | (° C.) | 103 | 105 | 102 | 103 | 95 | 106 | 107 |
| | | Elastic Modulus | (GPa) | 4.4 | 4.1 | 3.8 | 4.3 | 4.3 | 4.2 | 4.2 |
| | | Glass Transition Temperature (Tg) | (° C.) | 162 | 156 | 152 | 155 | 157 | 158 | 153 |
| | | Glass Transition Temperature after Moisture Absorption (Tg) | (° C.) | 130 | 128 | 122 | 128 | 127 | 126 | 120 |
| Prepreg Properties | | Epoxy Resin Composition Impregnation Ratio of Prepreg | (%) | 98 | 99 | 100 | 97 | 100 | 100 | 98 |
| Fiber Reinforced Plastics Properties | | Void Ratio | (%) | 0.9 | 0.6 | 1.1 | 0.8 | 0.8 | 0.9 | 0.8 |
| | | Compressive Strength | (MPa) | 1452 | 1445 | 1405 | 1448 | 1473 | 1408 | 1431 |

| | | | | Example | | | | | | |
|---|---|---|---|---|---|---|---|---|---|---|
| Item | | | Unit | 8 | 9 | 10 | 11 | 12 | 13 | 14 |
| Epoxy Resin Composition for Fiber Reinforced Plastics | Epoxy Resin Blend | (Essential Component A) | | | | | | | | |
| | | MY9655 | (Weight Parts) | 70 | 70 | 70 | 70 | 90 | 70 | 60 |
| | | LY1556 | (Weight Parts) | 30 | 30 | 30 | 30 | | | |
| | | GAN | (Weight Parts) | | | | | 10 | 30 | 40 |
| | | EPN1180 | (Weight Parts) | | | | | | | |
| | Thermoplastic Resin | SUMIKA EXCEL 5003P | (Weight Parts) | 10 | 10 | 10 | 10 | 25 | 25 | 25 |
| | Hardener | (Essential Component B) | | | | | | | | |
| | | Dyhard 100S | (Weight Parts) | 3 | 3 | 3 | 3 | 3 | 3 | 3 |
| | | (Essential Component C) | | | | | | | | |
| | | Aradur 9664-1 | (Weight Parts) | 30 | 10 | 10 | 10 | 10 | 10 | 10 |
| | Accelerator | (Essential Component D) | | | | | | | | |
| | | Omicure U-24 | (Weight Parts) | 7 | 5 | 5 | 5 | 5 | 5 | 5 |
| | | Dyhard UR200 | (Weight Parts) | | | | | | | |
| Epoxy Resin Properties | Viscosity | Viscosity at 40° C. | (Pa · s) | 4751 | 2471 | 2471 | 2471 | 2484 | 2332 | 1785 |
| | | Minimum Viscosity | (Pa · s) | 12 | 6 | 6 | 6 | 17 | 17 | 12 |
| | | Curing Start Temperature | (° C.) | 108 | 105 | 105 | 105 | 106 | 106 | 102 |
| | | Elastic Modulus | (GPa) | 4.5 | 4.1 | 4.1 | 4.1 | 4.3 | 4.1 | 3.9 |
| | | Glass Transition Temperature (Tg) | (° C.) | 159 | 158 | 158 | 156 | 160 | 155 | 150 |
| | | Glass Transition Temperature after Moisture Absorption (Tg) | (° C.) | 132 | 128 | 128 | 128 | 131 | 129 | 123 |
| Prepreg Properties | | Epoxy Resin Composition Impregnation Ratio of Prepreg | (%) | 100 | 71 | 37 | 83 | 99 | 98 | 100 |
| Fiber Reinforced Plastics Properties | | Void Ratio | (%) | 1.0 | 0.3 | 0.1 | 0.5 | 0.9 | 0.9 | 0.6 |
| | | Compressive Strength | (MPa) | 1492 | 1550 | 1592 | 1491 | 1462 | 1449 | 1403 |

| | | | | Example | | | | | | |
|---|---|---|---|---|---|---|---|---|---|---|
| Item | | | Unit | 15 | 16 | 17 | 18 | 19 | 20 | 21 |
| Epoxy Resin Composition for Fiber Reinforced Plastics | Epoxy Resin Blend | (Essential Component A) | | | | | | | | |
| | | MY9655 | (Weight Parts) | 70 | 70 | 90 | 70 | 70 | 70 | 70 |
| | | LY1556 | (Weight Parts) | | | | 30 | 30 | 30 | 30 |
| | | GAN | (Weight Parts) | 30 | 30 | | | | | |
| | | EPN1180 | (Weight Parts) | | | 10 | | | | |
| | Thermoplastic Resin | SUMIKA EXCEL 5003P | (Weight Parts) | 15 | 26 | 6 | 10 | 10 | 10 | 10 |
| | Hardener | (Essential Component B) | | | | | | | | |
| | | Dyhard 100S | (Weight Parts) | 3 | 3 | 3 | 3 | 3 | 3 | 3 |
| | | (Essential Component C) | | | | | | | | |
| | | Aradur 9664-1 | (Weight Parts) | 10 | 10 | 10 | 10 | 10 | 10 | 10 |
| | Accelerator | (Essential Component D) | | | | | | | | |
| | | Omicure U-24 | (Weight Parts) | 5 | 5 | 5 | 5 | 5 | 5 | 5 |
| | | Dyhard UR200 | (Weight Parts) | | | | | | | |
| Epoxy Resin Properties | Viscosity | Viscosity at 40° C. | (Pa · s) | 1205 | 5985 | 2568 | 2471 | 2471 | 2471 | 2471 |
| | | Minimum Viscosity | (Pa · s) | 2 | 20 | 13 | 6 | 6 | 6 | 6 |
| | | Curing Start Temperature | (° C.) | 99 | 109 | 109 | 105 | 105 | 105 | 105 |
| | | Elastic Modulus | (GPa) | 4.3 | 4.3 | 4.5 | 4.1 | 4.1 | 4.1 | 4.1 |
| | | Glass Transition Temperature (Tg) | (° C.) | 157 | 150 | 165 | 158 | 158 | 158 | 158 |
| | | Glass Transition Temperature after Moisture Absorption (Tg) | (° C.) | 129 | 122 | 135 | 128 | 128 | 128 | 128 |
| Prepreg Properties | | Epoxy Resin Composition Impregnation Ratio of Prepreg | (%) | 100 | 96 | 99 | 75 | 77 | 96 | 77 |
| Fiber Reinforced Plastics Properties | | Void Ratio | (%) | 1.2 | 1.3 | 1.2 | 0.7 | 0.3 | 0.3 | 0.3 |
| | | Compressive Strength | (MPa) | 1399 | 1388 | 1478 | 924 | 953 | 1497 | 706 |

| | | | | Example | Comparative Example | | | | | |
|---|---|---|---|---|---|---|---|---|---|---|
| Item | | | Unit | 22 | 1 | 2 | 3 | 4 | 5 | 6 |
| Epoxy Resin Composition for Fiber Reinforced Plastics | Epoxy Resin Blend | (Essential Component A) | | | | | | | | |
| | | MY9655 | (Weight Parts) | 70 | 50 | 70 | 70 | 70 | 70 | 70 |
| | | LY1556 | (Weight Parts) | 30 | 50 | 30 | 30 | 30 | 30 | 30 |
| | | GAN | (Weight Parts) | | | | | | | |
| | | EPN1180 | (Weight Parts) | | | | | | | |
| | Thermoplastic Resin | SUMIKA EXCEL 5003P | (Weight Parts) | 10 | 10 | 10 | 10 | 10 | 10 | 10 |
| | Hardener | (Essential Component B) | | | | | | | | |
| | | Dyhard 100S | (Weight Parts) | 3 | 3 | 0 | 3 | 3 | 3 | 3 |
| | | (Essential Component C) | | | | | | | | |
| | | Aradur 9664-1 | (Weight Parts) | 10 | 10 | 10 | 0 | 10 | 10 | 10 |
| | Accelerator | (Essential Component D) | | | | | | | | |
| | | Omicure U-24 | (Weight Parts) | 5 | 5 | 5 | 5 | | | |
| | | Dyhard UR200 | (Weight Parts) | | | | | | | 3 |
| Epoxy Resin Properties | Viscosity | Viscosity at 40° C. | (Pa·s) | 2471 | 1307 | 2102 | 1873 | 2395 | 2395 | 2269 |
| | | Minimum Viscosity | (Pa·s) | 6 | 12 | 4 | 3 | 3 | 3 | 6 |
| | | Curing Start Temperature | (° C.) | 105 | 102 | 134 | 105 | 121 | 121 | 118 |
| | | Elastic Modulus | (GPa) | 4.1 | 3.5 | 3.3 | 3.5 | 4.0 | 4.0 | 4.0 |
| | | Glass Transition Temperature (Tg) | (° C.) | 158 | 147 | 133 | 160 | 148 | 148 | 154 |
| | | Glass Transition Temperature after Moisture Absorption (Tg) | (° C.) | 128 | 118 | 105 | 119 | 117 | 117 | 123 |
| Prepreg Properties | | Epoxy Resin Composition Impregnation Ratio of Prepreg | (%) | 77 | 98 | 96 | 95 | 99 | 89 | 99 |
| Fiber Reinforced Plastics Properties | | Void Ratio | (%) | 0.3 | 1.2 | 1.7 | 0.9 | 2.3 | 1.8 | 1.6 |
| | | Compressive Strength | (MPa) | 761 | 1335 | 1302 | 1322 | 1355 | 1379 | 1369 |

| | | | | | Comparative Example | | |
|---|---|---|---|---|---|---|---|
| | | Item | | Unit | 7 | 8 | 9 |
| | Epoxy Resin Composition for Fiber Reinforced Plastics | Epoxy Resin Blend | (Essential Component A) | | | | |
| | | | MY9655 | (Weight Parts) | 70 | 70 | 70 |
| | | | LY1556 | (Weight Parts) | 30 | 30 | 30 |
| | | | GAN | (Weight Parts) | | | |
| | | | EPN1180 | (Weight Parts) | | | |
| | | Thermoplastic Resin | SUMIKA EXCEL 5003P | (Weight Parts) | 10 | 18 | 5 |
| | | Hardener | (Essential Component B) | | | | |
| | | | Dyhard 100S | (Weight Parts) | 3 | 3 | 3 |
| | | | (Essential Component C) | | | | |
| | | | Aradur 9664-1 | (Weight Parts) | 10 | 10 | 10 |
| | | Accelerator | (Essential Component D) | | | | |
| | | | Omicure U-24 | (Weight Parts) | | 5 | 5 |
| | | | Dyhard UR200 | (Weight Parts) | 5 | | |
| | Epoxy Resin Properties | Viscosity | Viscosity at 40° C. | (Pa·s) | 2401 | 11170 | 756 |
| | | | Minimum Viscosity | (Pa·s) | 8 | 32 | 2 |
| | | | Curing Start Temperature | (° C.) | 114 | 105 | 103 |
| | | | Elastic Modulus | (GPa) | 4.2 | 3.9 | 4.1 |
| | | | Glass Transition Temperature (Tg) | (° C.) | 155 | 153 | 155 |
| | | | Glass Transition Temperature after Moisture Absorption (Tg) | (° C.) | 123 | 124 | 128 |
| | Prepreg Properties | | Epoxy Resin Composition Impregnation Ratio of Prepreg | (%) | 98 | 99 | 99 |
| | Fiber Reinforced Plastics Properties | | Void Ratio | (%) | 1.4 | — | 1.9 |
| | | | Compressive Strength | (MPa) | 1355 | — | 1308 |

What is claimed is:

1. A prepreg comprising an epoxy resin composition and a reinforcing fiber,
wherein the epoxy resin composition comprising components (A), (B), (C), and (D), wherein the epoxy resin composition has a viscosity at 40° C. of about 1×10³ to about 1×10⁴ Pa·s, a curing start temperature of about 90 to about 110° C., and a minimum viscosity at the curing start temperature of about 2 to about 20 Pa·s, wherein the components (A), (B), (C), and (D) comprise:
(A) about 60 weight parts or more of a tetraglycidyl amine type epoxy resin per 100 weight parts of the epoxy resin composition, wherein an amount of tetraglycidyl amine type epoxy resin in the component (A) is between about 60 and about 95 weight parts per 100 weight parts of the epoxy resin composition; and the component (A) further comprises between about 5 and about 40 weight parts of an epoxy resin other than the tetraglycidyl amine type epoxy resin;
(B) dicyandiamide;
(C) diaminodiphenyl sulfone; and
(D) an urea compound comprising 2,4-toluene bisdimethyl urea;
wherein the epoxy resin composition has an impregnation ratio of the prepreg in a range from about 30% and less than 50%;
wherein the reinforcing fiber comprises a plurality of unidirectionally aligned fibers;
wherein a void ratio of the prepreg is less than 0.5.

2. The prepreg according to claim 1, wherein the epoxy resin other than the tetraglycidyl amine type epoxy resin is at least one type of epoxy resin selected from the group consisting of a bisphenol type epoxy resin, a glycidyl aniline type epoxy resin, an aminophenol type epoxy resin, a novolac type epoxy resin, and combinations thereof.

3. The prepreg according to claim 1, wherein an amount of the component (C) is between about 5 and about 30 weight parts per 100 weight parts of the epoxy resin composition.

4. The prepreg according to claim 1, wherein an amount of the component (D) is between about 3 and about 8 weight parts per 100 weight parts of the epoxy resin composition.

5. The prepreg according to claim 1, wherein a flexural modulus E at 25° C. of a cured resin obtained by curing the epoxy resin composition at 130° C. for 2 hours is between about 3.5 and about 4.5 GPa.

6. The prepreg according to claim 1, wherein a glass transition temperature of a cured resin obtained by curing the epoxy resin composition at 130° C. for 2 hours after immersing the cured resin in boiling water for 24 hours is about 120° C. or higher.

7. The prepreg according to claim 1, wherein only one side of the prepreg is covered substantially by the epoxy resin composition.

8. A fiber reinforced composite material comprising a thermally cured prepreg made by curing an uncured prepreg, wherein the uncured prepreg comprises the prepreg according to claim 1.

9. The prepreg of claim 1 wherein the further comprises a nonwoven material, a mat, a knit or a braid.

10. The prepreg of claim 1, further comprising a multi-axial fabric, wherein the multiaxial fabric has a window area greater than zero percent to increase a permeability of the prepreg to reduce a outgas time for the prepreg.

11. A prepreg comprising an epoxy resin composition and a reinforcing fiber-containing material,
wherein the epoxy resin composition comprising components (A), (B), (C), and (D), wherein the epoxy resin composition has a viscosity at 40° C. of about $1\times10^3$ to about $1\times10^4$ Pa·s, a curing start temperature of about 90 to about 110° C., and a minimum viscosity at the curing start temperature of about 2 to about 20 Pa·s, wherein the components (A), (B), (C), and (D) comprise:

(A) about 60 weight parts or more of a tetraglycidyl amine type epoxy resin per 100 weight parts of the epoxy resin composition, wherein an amount of tetraglycidyl amine type epoxy resin in the component (A) is between about 60 and about 95 weight parts per 100 weight parts of the epoxy resin composition; and the component (A) further comprises between about 5 and about 40 weight parts of an epoxy resin other than the tetraglycidyl amine type epoxy resin;

(B) dicyandiamide;

(C) diaminodiphenyl sulfone; and (D) an urea compound comprising 2,4-toluene bisdimethyl urea;

wherein the epoxy resin composition has an impregnation ratio of the prepreg in a range from about 30% and less than 50%;

wherein the reinforcing fiber-containing material comprises a multiaxial fabric;

wherein a void ratio of the prepreg is less than 0.5.

12. The prepreg according to claim 1,
wherein the epoxy resin composition has a viscosity at 40° C. of about $2\times10^3$ to about $6\times10^3$ Pa·s.

13. The prepreg according to claim 1,
wherein the minimum viscosity at the curing start temperature is about 3 to about 15 Pa·s.

14. The prepreg according to claim 11, wherein the epoxy resin composition has a viscosity at 40° C. of about $2\times10^3$ to about $6\times10^3$ Pa·s.

15. The prepreg according to claim 11, wherein the minimum viscosity at the curing start temperature is about 3 to about 15 Pa·s.

16. The prepreg of claim 1, wherein the void ratio of the prepreg is less than 0.3.

17. The prepreg of claim 1, wherein the void ratio of the prepreg is about 0.1.

18. The prepreg of claim 11, wherein the void ratio of the prepreg is less than 0.3.

19. The prepreg of claim 11, wherein the void ratio of the prepreg is about 0.1.

* * * * *